US006185592B1

United States Patent
Boguraev et al.

(10) Patent No.: US 6,185,592 B1
(45) Date of Patent: Feb. 6, 2001

(54) SUMMARIZING TEXT DOCUMENTS BY RESOLVING CO-REFERENTIALITY AMONG ACTORS OR OBJECTS AROUND WHICH A STORY UNFOLDS

(75) Inventors: Branimir Boguraev, Los Gatos, CA (US); Christopher David Kennedy, Chicago, IL (US)

(73) Assignee: Apple Computer, Inc., Cupertino, CA (US)

(*) Notice: Under 35 U.S.C. 154(b), the term of this patent shall be extended for 0 days.

(21) Appl. No.: 08/974,079

(22) Filed: Nov. 18, 1997

(51) Int. Cl.[7] .................................................. G06F 17/21

(52) U.S. Cl. .............................................. 707/531; 704/9

(58) Field of Search ............................. 707/530, 531; 704/9

(56) References Cited

U.S. PATENT DOCUMENTS

| | | | |
|---|---|---|---|
| 5,077,668 | * 12/1991 | Doi ....................................... | 707/531 |
| 5,130,924 | * 7/1992 | Barker et al. .......................... | 707/509 |
| 5,384,703 | * 1/1995 | Withgott et al. ...................... | 707/531 |
| 5,768,580 | * 6/1998 | Wical .................................... | 707/206 |
| 5,778,397 | * 7/1998 | Kupiec et al. ........................ | 707/500 |
| 5,794,178 | * 8/1998 | Caid et al. ............................... | 704/9 |
| 5,918,240 | * 6/1999 | Kupiec et al. ........................ | 707/531 |
| 5,924,108 | * 7/1999 | Fein et al. ............................. | 707/531 |
| 5,937,422 | * 8/1999 | Nelson et al. ........................ | 707/531 |
| 5,960,384 | * 9/1999 | Brash ...................................... | 704/9 |
| 5,963,940 | * 10/1999 | Liddy et al. ............................. | 707/5 |
| 5,963,969 | * 10/1999 | Tidwell ................................. | 707/531 |
| 5,978,820 | * 11/1999 | Mase et al. ........................... | 707/531 |
| 6,006,221 | * 12/1999 | Liddy et al. ............................. | 707/5 |
| 6,026,388 | * 2/2000 | Liddy et al. ............................. | 707/1 |
| 6,044,337 | * 3/2000 | Gorin et al. ............................. | 704/1 |

OTHER PUBLICATIONS

Komatsu et al, Summarization support system COGITO. . . , 1987, Oki Electric industry Co., Vol.87, No.84(NL–64), p. 85–91.*

Johnson et al, The application of linguistic processing to automatic abstract generation, 1993, Journal of Text and Management, vol. 1, No.3, p. 215–241.*

Miike et al, A full–text retrieval system with a dynamic abstract generation function, 1994, Springer–Verlag, p. 152–161.*

Paice, Constructing literature abstracts by computer: techniques and prospects, 1990, Information Processing & Management, vol.26, No.1, p. 171–186.*

Neal, A syntactic tool for resolution of anaphora, Mar. 1991, Aslib, p. 27–36.*

(List continued on next page.)

Primary Examiner—Stephen S. Hong
Assistant Examiner—Cesar B. Paula
(74) Attorney, Agent, or Firm—Sawyer Law Group LLP

(57) ABSTRACT

A method and system for characterizing the content of a document is disclosed. The method and system comprise identifying a plurality of discourse referents in the document, dividing the document into topically relevant document segments, and resolving co-referentiality among the discourse referents within, and across, the document segments. The method and system also comprises calculating salience values for the discourse referents based upon the resolving step, and determining topic stamps for the document segments based upon the salience values of the associated discourse referents. Finally the method and system comprise providing summary-like abstractions, in the form of capsule overviews of each of the segments derived from its topic stamps. In so doing, a capsule overview is derived for the entire document, which will depict the core content of an average length article in a more accurate and representative manner than utilizing conventional techniques.

20 Claims, 3 Drawing Sheets

OTHER PUBLICATIONS

Dagan et al, Syntax and lexical statistics in anaphora resolution, 1995, Applied Artifical Intelligence, v.9, n.6, p. 633–644.*

Takada et al, Extended centering mechanism for interpreting pronouns and zero–pronouns, 1995, IEICE Transactions on Information and Systems v.E78–D, n.1, p. 58–67.*

Mckeown et al, Generating Summaries of Multiple News Articles, 1995, Proceedings 18th annual international ACM SIGIR conf. on Research and development in info. retrieval, p. 74–82.*

Francois, Using Linguistic and Discourse Structures to Derive Topics, 1995, Proceedings of the 1995 conference on International conference on information and knowledge management, p. 44–49.*

Kita, A system for summarization of an explanation text, 1987, Joho Shori Gakkai Kenkyu Hokoku, v.87, n.68(NL–63), p. 63.6.1–63.6.8.*

"Anaphora for Everyone: Pronomial Anaphora Resolution without a Parser," Christopher Kennedy and Branimir Boguraev, To Be presented at International Conference on Computational Linguistics, Aug. 5–9, 1996.

"Anaphora in a Wider Context: Tracking Discourse Referents," Christopher Kennedy and Branimir Boguraev, $12^{th}$ European conference on Artifical Intelligence 1996., pp. 582–586.

* cited by examiner

"ONE DAY, everything Bill Gates has sold you up to now, whether it's Windows 95 or Windows 97, will become obsolete," declares Gilbert Amelio, the boss at Apple Computer. "Gates is vulnerable at that point. And we want to make sure we're ready to come forward with a superior answer." ─302

Bill Gates vulnerable? Apple would swoop in and take Microsoft's customers? Ridiculous! Impossible! In the last fiscal year, Apple lost $816 million; Microsoft made $2.2 billion. Microsoft has a market value thirty times that of Apple.

Outlandish and grandiose as Amelio's idea sounds, it makes sense for Apple to think in such big, bold terms. Apple is in a position where standing pat almost certainly means slow death.

It's a bit like a patient with a probably terminal disease deciding to take a chance on an untested but promising new drug. A bold strategy is the least risky stategy. As things stand, customers and outside software developers alike are deserting the company. Apple needs something dramatic to persuade them to stay aboard. A radical redesign of the desktop computer might do the trick. If they think the redesign has merit, they may feel compelled to get on the bandwagon lest it leave them behind.

Lots of "ifs," but you can't accuse Amelio of lacking vision. Today's desktop machines, he says, are ill-equipped to handle the coming power of the Internet. Tomorrow's machines must accommodate rivers of data, multimedia and multitasking (juggling several tasks simultaneously). ─304

We're past the point of upgrading, he says. Time to scrap your operating system and start over. The operating system is the software that controls how your computer's parts (memory, disk drives, screen) interact with applications like games and Web browsers. Once you've done that, buy new applications to go with the reengineered operating system.

Amelio, 53, brings a lot of credibility to this task. His resume includes both a rescue of National Semiconductor from near-bankruptcy and 16 patents, including one for co-inventing the charge-coupled device. ─306

But where is Amelio going to get this new operating system? From Be, Inc., in Menlo Park, Calif., a half-hour's drive from Apple's Cupertino headquarters, a hot little company founded by ex-Apple visionary Jean-Louis Gassee. Its BeOS, now undergoing clinical trials, is that radical redesign in operating systems that Amelio is talking about. Married to hardware from Apple and Apple cloners, the BeOS just might be a credible competitor to Microsoft's Windows, which runs on IBM-compatible hardware.

FIG. 3 300

SUMMARIZING TEXT DOCUMENTS BY RESOLVING CO-REFERENTIALITY AMONG ACTORS OR OBJECTS AROUND WHICH A STORY UNFOLDS

CROSS-REFERENCE TO RELATED APPLICATIONS

The present application is related to co-pending patent U.S. application Ser. No. 08/972,935, entitled "A System and Method for the Dynamic Presentation of the Contents of a Plurality of Documents for Rapid Skimming," filed on the same day and assigned to the same Assignee as the present application.

FIELD OF THE INVENTION

The present invention relates generally to a system and method for reviewing documents. More particularly, the present invention relates to characterizing documents in a manner that allows the user to quickly ascertain their contents.

BACKGROUND OF THE INVENTION

Documents obtained via an electronic medium (i.e., the Internet or on-line services, such as AOL, Compuserve or other services) are often provided in such volume that it is important to be able to summarize them. Oftentimes, it is desired to be able to quickly obtain a brief (i.e., a few sentences or a paragraph length) summary of the document rather than reading it in its completeness. Most typically, such documents span several paragraphs to several pages in length. This invention concerns itself with this kind of document, hereinafter referred to as average length document. Summarization of document content is clearly useful for assessing the contents of items such as news articles and press releases, where little a priori knowledge is available concerning what a document might be about; summarization or abstraction facility is even more essential in the framework of emerging "push" technologies, where a user might have very little control over what documents arrive at the desktop for his/her attention.

Conventional summarization techniques for average length documents fall within two broad categories. One category is those techniques which rely on template instantiation and the other category is those techniques that rely on passage extraction.

Template Instantiation

A template is best thought of as a set of predefined categories for a particular domain. A template instantiation technique for content summarization is based on seeking to instantiate the plurality of such categories with values obtained from the body of a document-assuming that the document fits the expected domain. These types of techniques are utilized for documents that can be conveniently assigned to a well-defined domain and are known to belong to such a domain. Examples of such constrained domains are news stories about terrorist attacks or corporate mergers and acquisitions in the micro-electronics domain.

Template instantiation systems are specially designed to search for and identify predefined features in text: restricting documents to a domain whose characteristic features are known ahead of time allows a program to identify specific aspects of the story such as: 'who was attacked', 'who was the perpetrator', 'was the acquisition friendly or hostile', and so forth. A coherent summary can be then constructed by "fitting" the facts in a template. Unfortunately, these systems are by design limited to the particular subject domains they were engineered to cover because the systems, in effect, search for particular words and word patterns and can only function assuming their existence, and mapping onto, the domain categories (see Ralph Grishman, "Information Extraction: Techniques and Challenges", in M. T. Pazienza (Ed.), "Information Extraction: A Multidisciplinary Approach to an Emerging Information Technology", Springer, 1997, and references therein).

Sometimes, a set of proper names and technical terms can be quite indicative of content. Phrasal matching techniques, developed for the purposes of template instantiation, are able to provide a list of the pertinent terms within a document. Such techniques have grown to become quite robust (see J. S. Justeson and S. M. Katz, "Technical Terminology: Some Linguistic Properties and an Algorithm for Identification in Text", Journal of Natural Language Engineering, vol.1(1), 1995; see also "Coping with Unknown Lexicalizations", in B. K. Boguraev and J. Pustejovsky (Eds.), "Corpus Processing for Lexical Acquisition", MIT Press, 1996). If a document is small enough then complete lists of proper names and technical terms can provide a relatively informative characterization of the document content. However, for longer documents the term list will be plagued by unnecessary and incorrect terms, ultimately defeating their representativeness as content abstractions.

Accordingly, this type of summarization technique requires a front end analysis sensitive to a domain description, and capable of filling out domain-specific templates which will provide for accurate summarization of the document; thus it depends on knowing, a priori, the document's domain.

Passage Extraction

Passage extraction techniques do not depend on prior knowledge of the domain. They are based on identifying certain passages of text (typically sentences) as being most representative of the document. This type of technique typically uses a statistical approach to compute the "closeness" between a sentence and the document as a whole. Generally speaking, this closeness is determined by mapping individual sentences, as well as the entire document, on to multidimensional vector space, and then performing mathematical calculations to determine how similar (by some appropriate metric) the sentence is to the text. Generally speaking, if a sentence has many words which repeatedly appear throughout the document, it will receive a relatively high score. Then, the highest ranking sentence(s) is (are) presented as a summary of the document.

Such "summarization" programs, some of which are beginning to get deployed commercially, do not provide true summaries, in the sense of a summary being e.g. an abstract capturing the essential, core content of a document. While being more indicative of what a document is about, when compared with only a title, for instance, such a set of sentences is under-representative of all the topics and themes possibly running through a document. A document may have several important topics discussed therewithin. Unfortunately, in such documents, while a small selection of sentences typically conveys the information relating to one topic, they may fail to convey the existence of other topics in the document.

Accordingly, what is needed is a system and method for analyzing documents to a finer grain of topic identification and content characterization than when utilizing conventional techniques. In a preferred embodiment of the invention, the system and method should be able to analyze documents with multiple topics. The analysis would be used to produce summary-like abstractions of the documents. The system and method should be easy to implement and costeffective. Furthermore, the content abstractions should contain relevant information from throughout the document, not just a selection of sentences that may miss significant topics. The present invention addresses these needs.

SUMMARY OF THE INVENTION

A method and system for characterizing the content of a document is disclosed. The method and system comprise identifying a plurality of discourse referents in the document, dividing the document into topically relevant document segments, and resolving co-referentiality among the discourse referents within, and across, the document segments. The method and system also comprises calculating salience values for the discourse referents based upon the resolving step, and determining topic stamps for the document segments based upon the salience values of the associated discourse referents. Finally the method and system comprise providing summary-like abstractions, in the form of capsule overviews of each of the segments derived from its topic stamps. In so doing, a capsule overview is derived for the entire document, which will depict the core content of an average length article in a more accurate and representative manner than utilizing conventional techniques.

BRIEF DESCRIPTION OF THE DRAWINGS

FIG. 3 is a capsule overview of an article.

DESCRIPTION OF THE INVENTION

The present invention relates to the characterization of the content of an average length document. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
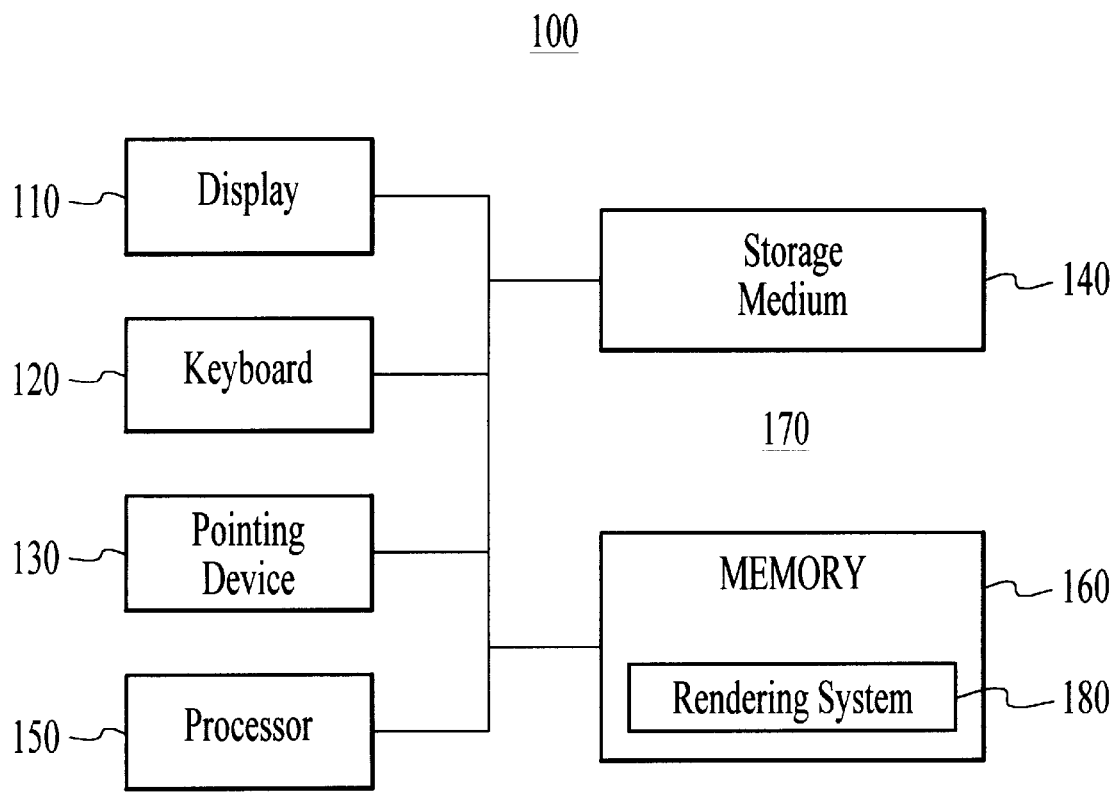
FIG. 1 is a block diagram illustrating a conventional computer system that serves as one type of operating environment for the present invention.

FIG. 1 is a block diagram illustrating a conventional computer system 100, which serves as one type of operating environment for the present invention. The computer system 100 includes a display 110, a keyboard 120, a pointing device 130, a storage medium 140, a processor 150, and a memory 160, which are all connected by a bus 170. The processor 150 operates in conjunction with the memory 160 to execute a rendering system 180 that enables the processor 150 to provide the content characterization from text files stored in some form of computer-readable medium, such as a CD-ROM, or from a network.

In a system and method in accordance with the present invention a technique can be utilized in a computer system to identify highly salient phrasal units across the entire span of a document that are capable of functioning as representative of the document's content. This set of phrasal units, referred to as "topic stamps" and typically presented in relational context, will be used to provide a "capsule overview" of the document. To further describe the concept of topic stamps and capsule overviews refer now to the following discussion.

Capsule Overviews

A capsule overview is not a true summary, in that it does not attempt to convey document content as a sequence of sentences. Instead, it is a semi-formal and normalized representation of the document, derived after a process of data reduction over the original text.

Through capsule overviews, a document's content is characterized in a way that is representative of the full flow of the document. This is in contrast to passage extraction techniques, which typically highlight only certain fragments. Also, capsule overviews are derived by carrying out linguistically intensive analysis of the text in a document, which seeks semantic prominence of linguistics expressions, rather than just occurrence of certain pre-specified, or highly frequent, words and phrases—thus the system and method described here can be applied to any document, independent of domain, style or genre.

A capsule overview is not an instantiated template. A primary consideration of the content characterization system and method described here is that they should not be specific to any document source or type. A capsule overview is a coherently presented list of linguistic expressions which refer to the most prominent objects mentioned in the document, i.e., its topic stamps, and furthermore provide richer specification of the relational contexts (e.g., verb phrases, minimal clauses) in which these expressions appear.

To further illustrate the concepts associated with a capsule overview, refer now to the following news article shown in Table 1. (Marking certain phrase units within single quotes is an annotation device, for subsequent references to the text from within this disclosure document; these annotations were not part of the original article.)

TABLE 1

Priest Is Charged with Pope Attack
'A Spanish Priest' was charged here today with attempting to murder the Pope. 'Juan Fernandez Krohn', aged 32, was arrested after 'a man armed with a bayonet' approached the Pope while he was saying prayers at Fatima on Wednesday night. According to the police, 'Fernandez' told the investigators today that 'he' trained for the past six months for the assault. 'He' was alleged to have claimed the Pope "looked furious" on hearing 'the priest's' criticism of his handling of the church's affairs. If found guilty, 'the Spaniard' faces a prison sentence of 15–20 years.

There are a number of reasons why the title, "Priest Is Charged with Pope Attack", is a highly representative abstraction of the content of the passage. It encapsulates the essence of what the story is about: there are two actors, identified by their most prominent characteristics; one of them has been attacked by the other; the perpetrator has been charged; there is an implication of malice to the act. The title brings the complete set of salient facts together, in a thoughtfully composed statement, designed to be brief yet informative. Whether a present day natural language analysis program can derive—without being primed of a domain and genre—the information required to generate such a summary is arguable. (This is assuming, of course, that natural language generation techniques could, in their own right, do the planning and delivery of such a concise and information-packed message.) However, part of the task of delivering accurate content characterization is being able to identify the components of this abstraction (e.g., 'priest', 'pope attack', 'charged with'). It is from these components that, eventually, a true summary of this document would begin to be constructed.

It is also precisely these components, viewed as phrasal units with certain discourse properties, that a capsule overview should present as a characterization of the context of the document. Accordingly, in the present invention, the most salient and therefore most representative phrasal units, as well as the relational expressions they are associated with, are identified to provide the core content of the document.

Figure 2:
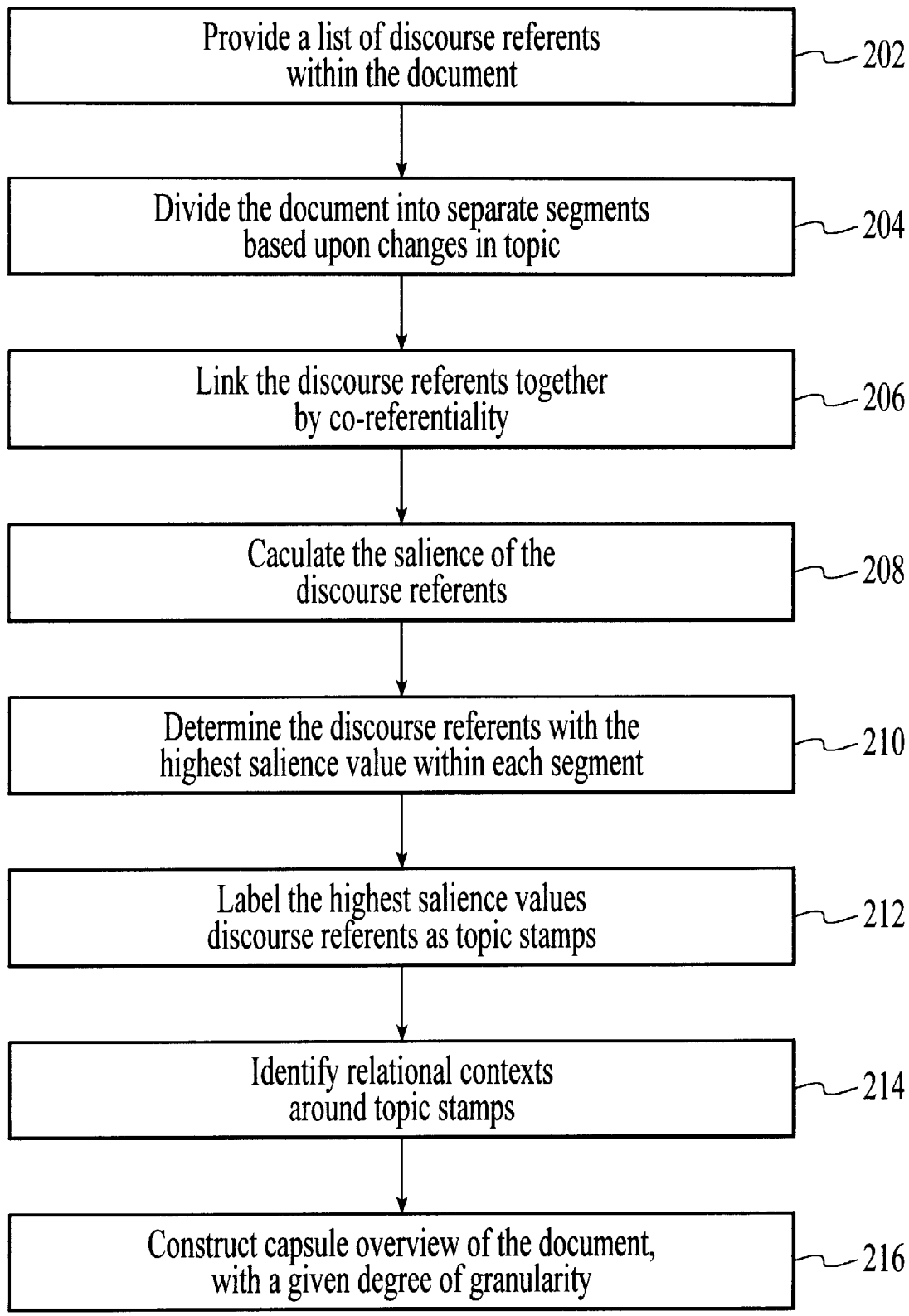
FIG. 2 is a flow chart of a system and method for characterizing the content of a document in accordance with the present invention.

To describe the generation of capsule overviews in accordance with the present invention in more detail refer now to FIG. 2 and the accompanying text. FIG. 2 is a flow chart of a system and method for characterizing the content of a document in accordance with the present invention. As is seen in the figure, first a list of discourse referents are provided within the document via step 202. Then, the document is divided into separate segments based upon changes in topic, via step 204. Thereafter, the discourse referents are linked together into co-reference classes, via step 206. Next, the salience for each of the discourse referents is calculated, via step 208. After those calculations are performed, then it is determined which discourse referents have the highest values within a segment, via step 210.

The core information unit that the invention concerns itself with is the set of discourse referents in a document. Discourse referents are typically realised as noun phrases. In essence, these are the entities—actors and objects—around which a story unfolds. In order to determine, and maintain, an accurate model of what a document is about, it is neccesary to be able to identify the ways in which the same entity is referred to in the text, as well as to establish co-referentiality among different 'mentions' in the text of the same entity. The sample document in Table 1 provides examples of the same entity being referred to in different ways in the text ("Priest", "a Spanish Priest", "Fernandez", and "he", in the second paragraph, all refer to the same person), as well as of different entities being referred to by the same text string ("he" in the first paragraph refers to the Pope, while "he" in the second paragraph referes to the priest).

Thereafter, discourse referents with the highest salience values are labelled as topic stamps, via step 212. The local contexts around each of the topic stamps are identified, via step 214. Finally, from this information a capsule overview of the document is constructed with a given degree of granularity via step 216. A key concept associated with generation of the capsule overviews is the calculation of salience values for the discourse referents, which are then used for determining topic stamps in the document. The following will discuss salience based calculations in more detail.

Salience-based Content Characterization

Salience is a measure of the relative prominence of objects in discourse: objects with high salience are the focus of attention; those with low salience are at the periphery. In an effort to resolve the problems facing a term-based approach to content characterization, as discussed in the background of the application, a procedure in accordance with the present invention has been developed which uses a salience feature as the basis for a "ranking by importance" of an unstructured referent set; ultimately, this facilitates topic stamp identification. By determining the salience of the members of a referent set, an ordering can be imposed which, in connection with an appropriate choice of threshold value, permits the reduction of the entire referent set to only those expressions that identify the most prominent participants in the discourse. This reduced set of terms, in combination with information about local context at various levels of granularity (verb phrase, minimal clause, sentence, etc.) offers an accurate and detailed characterization of a document's content. This may then be folded into an appropriate presentation metaphor such as that described in copending U.S. patent application Ser. No. 08/972,935 entitled "A System and Method for the Dynamic Presentation of the Contents of a Plurality of Documents for Rapid Skimming" and assigned to the assignee of the present application.

Crucially, such an analysis satisfies some important requirements of usability of document content abstractions: it is concise, it is coherent, and it does not introduce the cognitive overload associated with a full-scale term set. In a more general sense, this method utilizes a strategy for scaling up the phrasal analysis techniques utilized by standard term identification and template instantiation technologies, which has at its core the utilization of a crucial feature of discourse structure: the prominence, over some segment of text, of particular referents—something that is missing from the traditional technology for 'bare' terminology identification.

Anaphora Resolution and Local Salience

For the purposes of determining how discourse referents relate to objects in the world of the document, a simplifying assumption is made that every noun phrase identified by extended phrasal analysis constitutes a "mention" of a participant in the discourse. In order to determine which expressions constitute mentions of the same referent, the method described here crucially relies upon being able to carry out anaphora resolution and coreferent identification. Linguistic expressions that are identified as coreferential are grouped into equivalence classes, and each equivalence class is taken to represent a unique referent in the discourse. The set of such equivalence classes constitutes the full referent set from which, ultimately, topic stamps will be derived.

A distinctive feature of the anaphora resolution algorithm is that it has been specially adapted to work from a shallow syntactic base: specifically, it does not require full syntactic analysis of the text. This makes the method applicable to any text document, irrespective of its domain, style, or genre. This type of anaphora resolution algorithm is described, in full detail, in the paper "Anaphora for Everyone: Pronominal Anaphora Resolution Without a Parser," by C. Kennedy and B. Boguraev, which was presented at the 16th International Conference on Computational Linguistics, Copenhagen, Denmark, Aug. 5–9, 1996.

The immediate result of anaphora resolution is to reduce the extended phrase set of all mentions of objects in the discourse; the larger consequence is that it provides the basis for the identification of topic stamps, as it introduces both a working definition of salience and a formal mechanism for determining the salience of particular linguistic expressions. This connection between anaphora resolution, co-reference identification, discourse salience, and semantic prominence is described in fuller detail in "Anaphora for Everyone: Pronominal Anaphora Resolution Without a Parser," (C. Kennedy and B. Boguraev, in Proceedings of COLING-96 (16th International Conference on Computational Linguistics), Copenhagen, DK, Aug. 5–9, 1996) and "Anaphora in a Wider Context: Tracking Discourse Referents" (C. Kennedy and B. Boguraev, in W. Wahlster, Editor, Proceedings of ECAI-96 (12th European Conference on Artificial Intelligence), Budapest, Hungary, Aug. 11–16, 1996. John Wiley and Sons, Ltd., London/New York).

Roughly speaking, the anaphora resolution procedure locates an antecedent for an anaphoric expression by first eliminating all impossible candidate antecedents, then ranking the remaining candidates according to a salience measure and selecting the most salient candidate as the antecedent. This measure, which is referred to as 'local salience', is a function of how a candidate antecedent expression satisfies a set of grammatical, syntactic, and contextual parameters. These constraints are typically referred to as "salience factors". Individual salience factors are associated with numerical values, as shown below.

TABLE 2

"sent": 100 iff the expression is in the current sentence.
"cntx": 50 iff the expression is in the current discourse segment.
"subj": 80 iff the expression is a subject.
"exst": 70 iff the expression is in an existential construction.
"poss": 65 iff the expression is a possessive.
"acc": 50 iff the expression is a direct object.
"dat": 40 iff the expression is an indirect object.
"oblq": 30 iff the expression is the complement of a preposition.
"head": 80 iff the expression is not contained in another phrase.
"arg": 50 iff the expression is not contained in an adjunct.

The local salience of a candidate is the sum of the values of the salience factors that are satisfied by some member of the equivalence class to which the candidate belongs; values may be satisfied at most once by each member of the class. The most important aspect of these numerical values for our concerns is that they impose a relational structure on the salience factors, which in turn provides the basis for ordering referents according to their relative prominence in the discourse (in other words, what is important is not so much the values themselves but the fact that they denote that, for instance, "subj" factor indicates higher prominence than "acc", itself more prominent than "oblq", and so forth).

Discourse Salience and Capsule Overview

An important feature of local salience is that it is variable: the salience of a referent decreases and increases according to the frequency with which it is mentioned (taking into account subsequent anaphoric expressions). When an anaphoric link is established, the anaphor is added to the equivalence class to which its antecedent belongs, and the salience of the class is boosted accordingly. If a referent ceases to be mentioned in the text, however, its local salience is incrementally decreased; this reflects decay in its prominence. This approach works well for the purpose of anaphora resolution, because it provides a realistic representation of the antecedent space for an anaphor by ensuring that only those referents that have mentions within a local domain have increased prominence. However, the ultimate goal of salience-based content characterization differs from that of anaphora resolution in an important respect. In order to determine which linguistic expressions should be presented as broadly representative of the content of a document, it is necessary to generate a picture of the prominence of referents across the entire discourse, not just within a local domain.

For illustration of the intuition underlying this idea, consider the news article discussed in Table 1. Intuitively, the reason why "priest" is at the focus of the title is that there are no less than eight references to the same actor in the body of the story (marked by single quotes in the example); moreover, these references occur in prominent syntactic positions: five are subjects of main clauses, two are subjects of embedded clauses, and one is a possessive. (This example also illustrates the rationale behind the above-described salience factors.) Similarly, the reason why "Pope attack" is the secondary object of the title is that a constituent of the compound, "Pope", also receives multiple mentions (five), although these references tend to occur in less prominent positions (two are direct objects).

In order to generate the broader picture of discourse structure needed to inform the selection of certain expressions as most salient, and therefore most representative of content, we introduce an elaboration of the local salience computation described above that uses the same conditions to calculate a non-decreasing, global salience value for every referent in the text. This non-decreasing salience measure, which is referred to as 'discourse salience', reflects the distributional properties of a referent as the text story unfolds. In conjunction with the "tracking" of referents made available by anaphora resolution—as discussed at some length in: "Anaphora in a wider context: Tracking discourse referents" (C. Kennedy and B. Boguraev, in W. Wahlster, editor, Proceedings of ECAI-96 (12th European Conference on Artificial Intelligence), Budapest, Hungary, Aug. 11–16, 1996. John Wiley and Sons, Ltd, London/New York)—discourse salience provides the basis for a coherent representation of discourse structure that indicates the topical prominence of individual mentions of referents in isolated segments of text.

Most importantly, discourse salience provides exactly the information that is needed to impose the type of importance-based ranking of referents which is required for the identification of topic stamps. Specifically, by associating every referent with a discourse salience value, we can identify the topic stamps for a segment of text S as the n highest ranked referents in S, where n is a scalable value.

The notion "segment of text" plays an extremely important role in the content characterization task, as it provides the basic information-structuring units around which a capsule overview for a document is constructed. Again, the example from Table 1 gives a useful illustration of the important issues. The reason that the title of this passage works as an overview of its content is because the text itself is fairly short. As a text increases in length, the "completeness" of a short description as a characterization of content deteriorates. If the intention is to use concise descriptions consisting of one or two salient phrases—i.e., topic stamps—along with information about the local context in which they appear as the primary information-bearing units for a capsule overview, then it follows that texts longer than a few paragraphs must be broken down into smaller units or "segments".

In order to solve this problem, a document is recast as a set of 'discourse segments', which correspond to topically coherent, contiguous sections of text. One approach to segmentation which works well for the purposes of this method implements a similarity-based algorithm along the lines of that described by Hearst, in her paper entitled "Multi-Paragraph Segmentation of Expository Text." (M. Hearst, in 32nd Annual Meeting of the Association for Computational Linguistics, Las Cruces, N. Mex., 1994), which identifies discourse segments in text using a lexical similarity measure. By calculating the discourse salience of referents with respect to the results of discourse segmentation, each segment can be associated with a listing of those expressions that are most salient within the segment, i.e., each segment can be assigned a set of topic stamps. The result of these calculations, namely the set of segment-topic stamp pairs, ordered according to linear sequencing of the segments in the text, can then be returned as the capsule overview for the entire document. In this way, the problem of content characterization of a large text is reduced to the problem of finding topic stamps for each discourse segment.

Capsule Overview Example

The following discussion describes an example of an article the analysis of which utilizes the present invention.

The operational components of salience-based content characterization fall in the following categories: discourse segmentation; phrasal analysis (of nominal expressions and their relational contexts); anaphora resolution and generation of the reduced referent set; calculation of discourse salience and identification of topic stamps; and enriching topic stamps with information about relational context(s). Some of the functionality follows directly from technology developed for the purposes of terminology identification; in particular, both relation identification and extended phrasal analysis are carried out by running a phrasal grammar over a stream of text tokens tagged for lexical, morphological, and syntactic information, and for grammatical function; this is in addition to a grammar mining for terms and, generally, referents. In a preferred embodiment the base level linguistic analysis is provided by the LINGSOFT supertagger; see F. Karlsson, A. Voutilainen, J. Heikkila, and A. Antilla, "Constraint Grammar: A Language-Independent System for Parsing Free Text", Mouton de Gruyter, 1995. The later, more semantically-intensive algorithms are described in detail in "Anaphora for Everyone: Pronominal Anaphora Resolution Without a Parser" (C. Kennedy and B. Boguraev, in Proceedings of COLING-96 (16th International Conference on Computational Linguistics), Copenhagen, DK, 1996) and "Anaphora in a Wider Context: Tracking Discourse Referents" (C. Kennedy and B. Boguraev, in W. Wahlster, editor, Proceedings of ECAI-96 (12th European Conference on Artificial Intelligence), Budapest, Hungary, 1996. John Wiley and Sons, Ltd, London/New York). The procedure is illustrated by highlighting certain aspects of a capsule overview of an article 300 shown in FIG. 3.

The document is of medium-to-large size (approximately four pages in print), and focuses on the strategy of Gilbert Amelio (former CEO of Apple Computer) concerning a new operating system for the Macintosh. Too long to quote here in full, the following passage from the beginning of the article contains the first, second and third segments (shown at 302, 304, and 306 in FIG. 3), as identified by the discourse segmentation component. (In the figure, segment boundaries are marked by extra vertical space; this markup is for illustration purposes only, and indicates the result of running the discourse segmentation algorithm. No such demarcation exists in the source of the article itself).

The capsule overview was automatically generated by a fully implemented, and operational, system, which incorporates all of the processing components identified above. The relevant sections of the overview of the article 300 (for the three segments of the passage quoted) are shown in Tables 3, 4 and 5 below.

The topic stamps for the three segments 302, 304 and 306 constitute the core data out of which a capsule overview is constructed; these are shown immediately following the segment sequence identifies (in square brackets). The capsule overview itself displays the topic stamps (highlighted in single quotes) in their relational contents.

TABLE 3

[1] Apple; Microsoft
'Apple' would swoop in and take 'Microsoft's' customers?
'Apple' lost $816 million;
'Microsoft' made $2.2 billion.
'Microsoft' has a market value thirty times that of 'Apple'
it makes sense for 'Apple'
'Apple' is in a position
'Apple' needs something dramatic

TABLE 4

[2] desktop machines; operating system
Today's 'desktop machines', he [Gilbert Amelio] says
Tomorrow's 'machines' must accommodate rivers of data
Time to scrap your 'operating system' and start over
The 'operating system' is the software that controls
to go with the 'reengineered operating system'

TABLE 5

[3] Gilbert Amelio; new operating system
'Amelio', 53, brings a lot of credibility to this task
'His' [Gilbert Amelio] resume includes
where is 'Amelio' going to get this 'new operating system'?
radical redesign in 'operating systems' that 'Amelio' is talking about The division of this passage into segments, and the segment-based assignment of topic stamps, exemplifies a capsule overview's "tracking" of the underlying coherence of a story. The discourse segmentation component recognizes shifts in topic—in this example, the shift from discussing the relation between Apple and Microsoft to some remarks on the future of desktop computing to a summary of Amelio's background and plans for Apple's operating system. Layered on top of segmentation are the topic stamps themselves, in their relational contexts, at a phrasal level of granularity.

The first segment (Table 3) sets up the discussion by positioning Apple opposite Microsoft in the marketplace and focusing on their major products, the operating systems. The topic stamps identified for this segment, "Apple" and "Microsoft", together with their local contexts, are both indicative of the introductory character of the opening paragraphs and highly representative of the gist of the first segment. Note that the apparent uninformativeness of some relational contexts, for example, " . . . 'Apple' is in a position . . . ", does not pose a serious problem. An adjustment of the granularity—at capsule overview presentation time such as described in U.S. Pat. No. 08/972,935, entitled "A System and Method for the Dynamic Presentation of the Contents of a Plurality of Documents for Rapid Skimming and assigned to the assignee of the present invention—reveals the larger context in which the topic stamp occurs (e.g., a sentence), which in turn inherits the high topicality ranking of its anchor: "'Apple' is in a position where standing pat almost certainly means slow death."

For the second segment (Table 4) of the sample, "operating system" and "desktop machines" have been identified as representative. The set of topic stamps and contexts illustrated provides an encapsulated snapshot of the segment, which introduces Amelio' s views on coming challenges for desktop machines and the general concept of an operating system. Again, even if some of these are somewhat under-specified, more detail is easily available by a change in granularity, which reveals the definitional nature of the even larger context "The 'operating system' is the software that controls how your computer's parts . . . "

The third segment (Table 5) of the passage exemplified above is associated with the stamps "Gilbert Amelio" and "new operating system". The reasons, and linguistic rationale, for the selection of these particular noun phrases as topical are essentially identical to the intuition behind "priest" and "Pope attack" being the central topics of the example in Table 1. The computational justification for the choices lies in the extremely high values of salience, resulting from taking into account a number of factors:

co-referentiality between "Amelio" and "Gilbert Amelio", co-referentiality between "Amelio" and "His", syntactic prominence of "Amelio" (as a subject) promoting topical status higher than for instance "Apple" (which appears in adjunct positions), high overall frequency (four, counting the anaphor, as opposed to three for "Apple"—even if the two get the same number of text occurrences in the segment), and boost in global salience measures, due to "priming" effects of both referents for "Gilbert Amelio" and "operating system" in the prior discourse of the two preceding segments. Compared to a single phrase summary in the form of, say, "Amelio seeks a new operating system", the overview for the closing segment comes close; arguably, it is even better than any single phrase summary.

As the discussion of this example illustrates, a capsule overview is derived by a process which facilitates partial understanding of the text by the user. The final set of topic stamps is designed to be representative of the core of the document content. It is compact, as it is a significantly cut-down version of the full list of identified terms. It is highly informative, as the terms included in it are the most prominent ones in the document. It is representative of the whole document, as a separate topic tracking module effectively maintains a record of where and how referents occur in the entire span of the text. As the topics are, by definition, the primary content-bearing entities in a document, they offer accurate approximation of what that document is about.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for characterizing the content of a document comprising the steps of:
   a) identifying a plurality of discourse referents in the document;
   b) dividing the document into topically relevant document segments;
   c) resolving co-referentiality among the discourse referents within, and across, the document segments;
   d) calculating salience values for the discourse referents based upon the resolving step;
   e) determining topic stamps for the document segments based upon discourse salience values of the associated discourse referents; and
   f) providing a capsule overview of the document, constructed from the topic stamps.

2. The method of claim 1 in which step (a) comprises the step of generating a plurality of discourse referents from a plurality of phrasal units.

3. The method of claim 1 in which the resolving step (c) comprises linking the discourse referents by co-referentiality with each other to assess a frequency with which they appear within a document and to establish prominence.

4. The method of claim 3 in which the salience calculating step (d) comprises evaluating a predetermined number of salience factors associated with each discourse referent.

5. The method of claim 4 in which the salience calculating step (d) assesses a plurality of anaphoric expressions on a basis of a shallow syntactic base alone.

6. The method of claim 5 wherein co-referentiality is determined primarily by resolving anaphoric expressions, and is represented by grouping discourse referents into equivalence classes.

7. The method of claim 6 in which the calculating step (d) comprises calculating a local salience value for each of the discourse referents and calculating a discourse salience value on the basis of co-reference classes of discourse referents.

8. The method of claim 7 in which the local salience value is the sum of the values of the salience factors that are satisfied by some member of the equivalence class to which a candidate antecedent belongs.

9. The method of claim 7 in which the discourse salience is defined to be a measure of the prominence of discourse referents across the document.

10. A system for characterizing the content of a document comprising:
    means for identifying a plurality of discourse referents in the document;
    means for dividing the document into topically relevant document segments;
    means for resolving co-referentiality among the discourse referents within, and across, the document segments;
    means for calculating salience values for the discourse referents based upon the resolving step;
    means for determining topic stamps for the document segments based upon discourse salience values of the associated discourse referents; and
    means for providing a capsule overview of the document, constructed from the topic stamps.

11. The system of claim 10 in which the identifying means comprises means for generating a plurality of discourse referents from a plurality of phrasal units.

12. The system of claim 10 in which the resolving means comprises means for linking the discourse referents by co-referentiality with each other to assess a frequency with which they appear within a document and to establish prominence.

13. The system of claim 12 in which the salience calculating means comprises means for evaluating a predetermined number of salience factors associated with each discourse referent.

14. The system of claim 13 in which the salience calculating means assesses a plurality of anaphoric expressions on a basis of a shallow syntactic base alone.

15. The system of claim 14 wherein co-referentiality is determined primarily by resolving anaphoric expressions, and is represented by grouping discourse referents into equivalence classes.

16. The system of claim 15 in which the calculating means comprises means for calculating a local salience value for each of the discourse referents and calculating a discourse salience value on the basis of co-reference classes of discourse-referents.

17. The system of claim 16 in which the local salience value is the sum of the values of the salience factors that are satisfied by some member of the equivalence class of which a candidate antecedent belongs.

18. The system of claim 16 in which the discourse salience is defined to be a measure of the prominence of discourse referents across the document.

19. A method for characterizing the content of a document comprising the steps of:
    a) identifying a plurality of discourse referents in the document;
    b) dividing the document into topically relevant document segments;

c) resolving co-referentiality among the discourse referents within, and across, the document segments, wherein the resolving step comprises linking the discourse referents by co-referentiality with each other to assess a frequency with which they appear within a document and to establish prominence;

d) calculating salience values for the discourse referents based upon the resolving step;

e) determining topic stamps for the document segments based upon discourse salience values of the associated discourse referents; and f) providing a capsule overview of the document, constructed from the topic stamps.

20. A system for characterizing the content of a document comprising:

means for identifying a plurality of discourse referents in the document;

means for dividing the document into topically relevant document segments;

means for resolving co-referentiality among the discourse referents within, and across, the document segments wherein the resolving means comprises means for linking the discourse referents by co-referentiality with each other to assess a frequency with which they appear within a document and to establish prominence;

means for calculating salience values for the discourse referents based upon the resolving step;

means for determining topic stamps for the document segments based upon discourse salience values of the associated discourse referents; and means for providing a capsule overview of the document, constructed from the topic stamps.

\* \* \* \* \*